United States Patent
Candry et al.

(10) Patent No.: US 9,986,214 B2
(45) Date of Patent: May 29, 2018

(54) DISPLAY SYSTEMS AND METHODS EMPLOYING TIME MULTIPLEXING OF PROJECTION SCREENS AND PROJECTORS

(71) Applicant: Barco, Inc., Rancho Cordova, CA (US)

(72) Inventors: Patrick Candry, Kuurne (BE); Bart Maximus, Kuurne (BE); Geert Matthys, Kuurne (BE); Claude Tydtgat, Kuurne (BE)

(73) Assignee: Barco, Inc., Rancho Cordova, CA (US)

( * ) Notice: Subject to any disclaimer, the term of this patent is extended or adjusted under 35 U.S.C. 154(b) by 0 days. days.

(21) Appl. No.: 14/804,648

(22) Filed: Jul. 21, 2015

(65) Prior Publication Data

US 2016/0088270 A1 Mar. 24, 2016

Related U.S. Application Data

(60) Provisional application No. 62/027,610, filed on Jul. 22, 2014.

(51) Int. Cl.
*H04N 9/31* (2006.01)
*G03B 21/60* (2014.01)
(Continued)

(52) U.S. Cl.
CPC ......... *H04N 9/3147* (2013.01); *G02F 1/1313* (2013.01); *G02F 1/1334* (2013.01);
(Continued)

(58) Field of Classification Search
CPC .................................................... H04N 9/3147
(Continued)

(56) References Cited

U.S. PATENT DOCUMENTS

| 4,435,047 A | 3/1984 | Fergason |
| 4,616,903 A | 10/1986 | Fergason |

(Continued)

FOREIGN PATENT DOCUMENTS

| CN | 101303456 | 11/2008 |
| CN | 101888565 | 11/2010 |

(Continued)

OTHER PUBLICATIONS

Bolas et al.: "Environmental and Immersive Display Research at the University of Southern California," IEEE VR 2006 Workshop on Emerging Display Technologies, in 4 pages.

(Continued)

*Primary Examiner* — Michael Lee
*Assistant Examiner* — Justin Sanders
(74) *Attorney, Agent, or Firm* — Knobbe, Martens, Olson & Bear, LLP (57) ABSTRACT

An immersive display system is disclosed that includes screens configured to mitigate reduction in contrast ratio due at least in part to peripheral light incident on the screens. The immersive display system includes at least two screens and at least two projector systems. The screens have a multi-layered structure configured to selectively reflect light for controlled periods of time. Adjacent screens can be configured to selectively reflect light during different periods of time. The projector systems can be configured to project video onto their respective screens while the associated screen is configured to selectively reflect light rather than absorb light.

16 Claims, 7 Drawing Sheets

(51) Int. Cl.

| | | |
|---|---|---|
| G02F 1/13 | (2006.01) | |
| G02F 1/133 | (2006.01) | |
| G02F 1/1333 | (2006.01) | |
| G02F 1/1334 | (2006.01) | |
| G02F 1/1335 | (2006.01) | |
| G03B 37/04 | (2006.01) | |

(52) U.S. Cl.
CPC ...... *G02F 1/13306* (2013.01); *G02F 1/13336* (2013.01); *G02F 1/133502* (2013.01); *G02F 1/133512* (2013.01); *G03B 21/60* (2013.01); *G03B 37/04* (2013.01)

(58) Field of Classification Search
USPC .......................................................... 348/789
See application file for complete search history.

(56) References Cited

U.S. PATENT DOCUMENTS

| | | | |
|---|---|---|---|
| 4,679,069 A | | 7/1987 | Andrea et al. |
| 5,137,450 A | | 8/1992 | Thomas |
| 5,148,309 A | | 9/1992 | Yamada et al. |
| 5,193,015 A | | 3/1993 | Shanks |
| 5,528,425 A | | 6/1996 | Beaver |
| 5,625,489 A | | 4/1997 | Glenn |
| 5,644,369 A | | 7/1997 | Jachimowicz et al. |
| 5,715,083 A | | 2/1998 | Takayama |
| 5,964,064 A | | 10/1999 | Goddard et al. |
| 6,011,580 A | | 1/2000 | Hattori et al. |
| 6,144,491 A | | 11/2000 | Orikasa et al. |
| 6,184,934 B1 * | | 2/2001 | Nishiki .................. H04N 9/12 348/383 |
| 6,381,068 B1 | | 4/2002 | Harada et al. |
| 6,392,726 B2 | | 5/2002 | Goto et al. |
| 6,924,833 B1 | | 8/2005 | McDowall et al. |
| 6,988,803 B2 | | 1/2006 | Maximus |
| 7,035,006 B2 | | 4/2006 | Umeya et al. |
| 7,347,556 B2 | | 3/2008 | Kasik et al. |
| 7,414,831 B1 | | 8/2008 | Brown et al. |
| 7,471,352 B2 | | 12/2008 | Woodgate et al. |
| 7,679,828 B2 | | 3/2010 | Munro |
| 7,931,337 B2 | | 4/2011 | Shinozaki et al. |
| 8,149,508 B2 | | 4/2012 | Ferren et al. |
| 8,179,424 B2 | | 5/2012 | Moller |
| 8,277,055 B2 | | 10/2012 | Kuhlman et al. |
| 8,388,138 B1 | | 3/2013 | Boothroyd |
| 8,567,953 B2 | | 10/2013 | O'Dor et al. |
| 8,692,861 B2 | | 4/2014 | Liu et al. |
| 8,714,746 B2 | | 5/2014 | Choi et al. |
| 8,780,039 B2 | | 7/2014 | Gay et al. |
| 8,786,683 B2 | | 7/2014 | Akita |
| 2001/0030804 A1 | | 10/2001 | Lambert et al. |
| 2003/0117704 A1 | | 6/2003 | Lippey et al. |
| 2005/0068620 A1 | | 3/2005 | Umeya |
| 2005/0231800 A1 | | 10/2005 | Lippey |
| 2005/0264882 A1 | | 12/2005 | Daiku |
| 2006/0056021 A1 | | 3/2006 | Yeo et al. |
| 2006/0114171 A1 | | 6/2006 | Vascotto et al. |
| 2006/0257586 A1 | | 11/2006 | Umeya |
| 2006/0268013 A1 | | 11/2006 | Miles |
| 2007/0014318 A1 | | 1/2007 | Hajjar et al. |
| 2007/0127121 A1 | | 6/2007 | Maximus et al. |
| 2007/0133089 A1 | | 6/2007 | Lipton et al. |
| 2007/0206280 A1 | | 9/2007 | May et al. |
| 2008/0080047 A1 * | | 4/2008 | Field .................. G03B 21/56 359/443 |
| 2009/0246404 A1 | | 10/2009 | Greer et al. |
| 2010/0002154 A1 | | 1/2010 | Hua |
| 2011/0096136 A1 * | | 4/2011 | Liu .................. H04N 7/144 348/14.07 |
| 2011/0157694 A1 | | 6/2011 | Ferren et al. |
| 2012/0026157 A1 | | 2/2012 | Unkel et al. |
| 2012/0320049 A1 | | 12/2012 | Kim et al. |
| 2013/0181901 A1 | | 7/2013 | West et al. |
| 2013/0222557 A1 | | 8/2013 | Kuo et al. |
| 2013/0286154 A1 | | 10/2013 | Wittke et al. |
| 2013/0300637 A1 | | 11/2013 | Smits et al. |
| 2013/0308183 A1 | | 11/2013 | Vermeirsch et al. |
| 2014/0016041 A1 | | 1/2014 | Kim et al. |
| 2014/0016042 A1 | | 1/2014 | Yamauchi |
| 2014/0016099 A1 | | 1/2014 | Choi et al. |
| 2014/0375914 A1 | | 12/2014 | Murao et al. |
| 2016/0088271 A1 | | 3/2016 | Candry et al. |
| 2016/0088272 A1 | | 3/2016 | Candry et al. |
| 2016/0116834 A1 | | 4/2016 | Candry et al. |
| 2016/0202478 A1 | | 7/2016 | Masson et al. |

FOREIGN PATENT DOCUMENTS

| | | |
|---|---|---|
| CN | 202939369 | 5/2013 |
| EP | 0608969 A1 | 8/1994 |
| EP | 2685312 | 1/2014 |
| JP | 2000-338449 | 12/2000 |
| JP | 2002-365730 | 12/2002 |
| JP | 2007/180979 | 7/2007 |
| JP | 2008-175960 | 7/2008 |
| JP | 2009-198699 | 9/2009 |
| JP | 2011-128633 | 6/2011 |
| KR | 100596240 B1 | 7/2006 |
| WO | WO 1991/015930 | 10/1991 |
| WO | WO 2004/010681 | 1/2004 |
| WO | WO 2008/091339 | 7/2008 |
| WO | WO 2009/040698 | 4/2009 |
| WO | WO 2011/062822 | 5/2011 |
| WO | WO 2012/040797 | 4/2012 |
| WO | WO 2012/064621 | 5/2012 |
| WO | WO 2013/063235 | 5/2013 |
| WO | WO 2013/095967 | 6/2013 |
| WO | WO 2013/182018 | 12/2013 |
| WO | WO 2015/036501 | 3/2015 |
| WO | WO 2016/014479 | 1/2016 |
| WO | WO 2016/014506 | 1/2016 |
| WO | WO 2016/014560 | 1/2016 |
| WO | WO 2016/069631 | 5/2016 |

OTHER PUBLICATIONS

Eyevis GmbH, Immersive Cube System brochure, Feb. 2009, in 2 pages.
Eon Icube, website printout, available at http://www.eonreality.com/eon-icube/; retrieved Dec. 7, 2015 in 7 pages.
Gross et al.: "blue-c: A Spatially Immersive Display and 3D Video Portal for Telepresence," ACM Transactions on Graphics (TOG)—Proceedings of ACM Siggraph 2003 TOG, vol. 22, Issue 3, Jul. 2003, ACM New York, NY, USA, pp. 819-827.
PCT Search Report and Written opinion for PCT/US15/41267 dated Dec. 4, 2015 in 17 pages.
PCT International Preliminary Report on Patentability for PCT/US15/41267 dated Feb. 2, 2017 in 8 pages.
Extended European search report for EP 15825004.3 dated Feb. 23, 2018 in 6 pages.
Rogowitz, 'The Human Visual System: A Guide for the Display Technologist', Nov. 1983.
Farrell et al., 'Design Handbook for Imagery Interpretation Equipment', Boeing Aerospace Company, Feb. 1984, pp. 3.2-42 3.2-46.
B. Bahadur, 'Liquid Crystals Applications and Uses', pp. 27-28, 1991.
S. Hou et al., 'Ultra-Bright Heads-Up Display Using a Method of Projected Color Images by Combination of LEDs and Polymer-Dispersed Liquid Crystal', IEEE Journal of Display Technology, vol. 10, No. 3, Mar. 2014.
J. W. Doane, 'Polymer Dispersed Liquid Crystal Displays', Chapter 14 in Liquid Crystals Applications and Uses, Edited by Birendra Bahadur, pp. 361-395, 1990.
S. Wu et al., 'Reflective Liquid Crystal Displays', Wiley SID Series in Display Technology, pp. 174-192, 2001.
S. Wu, 'Liquid Crystals', Chapter 14, Handbook of Optics, pp. 14-1-14-26, 1995.

(56) References Cited

OTHER PUBLICATIONS

J. W. Doane et al., 'Field controlled light scattering from nematic microdroplets', Applied Physics Letters, vol. 48(4), Jan. 27, 1986, pp. 269-271.
S. Shikama et al., 'High-Luminance LCD Projector Using a-Si TFT PDLC Light Valves', Digest of Technical Papers, vol. XXVI, 1995, Society for Information Display, pp. 231-234.
R. V. Kollarits et al., 'An Eye-Contact Camera/Display System for Videophone Applications', Digest of Technical Papers, vol. XXVI, 1995, Society For Information Display, pp. 765-768.
K. Takizawa et al., 'Polymer-Dispersed Liquid-Crystal Light Valves for Projection Displays', Digest of Technical Papers, vol. XXII, 1991, Society For Information Display, pp. 250-253.
M. Rettinger, 'Sound Transmission Through Perforated Screens', SMPTE Journal, Dec. 1982, pp. 1171-1174.

* cited by examiner

DISPLAY SYSTEMS AND METHODS EMPLOYING TIME MULTIPLEXING OF PROJECTION SCREENS AND PROJECTORS

CROSS-REFERENCE TO RELATED APPLICATIONS

This application claims the benefit of priority to U.S. Prov. App'n No. 62/027,610, filed Jul. 22, 2014, entitled "Display Systems and Methods Employing Time Multiplexing of Projection Screens and Projectors," which is incorporated by reference herein in its entirety.

BACKGROUND

Field

The present disclosure generally relates to projection display systems and methods having one or more projection displays arranged for immersive viewing of an image and includes systems and methods to enhance at least the dynamic range and the contrast ratio of the image based at least in part on time multiplexing of the projection screen properties synchronized with the projectors.

Description of Related Art

Digital cinema servers and projectors receive digital content for projection in a theater or other venue. The content can be packaged in one or more digital files for delivery and storage on a media server. The media server can then extract the digital content from the one or more digital files for display using one or more projectors. In some cases, the content can be 3D video projected onto a screen where slightly different visual content is projected for simultaneous observation in the right and left eyes of a viewer to create the illusion of depth. A multi-projection system can be used to display video on a plurality of screens in a venue, such as in a theater or auditorium, to facilitate an immersive experience for the viewer.

SUMMARY

Example embodiments described herein have innovative features, no single one of which is indispensable or solely responsible for their desirable attributes. Without limiting the scope of the claims, some of the advantageous features will now be summarized.

An immersive display system can include a plurality of projection systems arranged to provide immersive viewing of video. Such an immersive display system can include a plurality of projector systems that each projects video configured to complement one another to provide an immersive viewing experience for viewers. Each projector system can be configured to project its video onto a projection surface placed around an audience. In this way, the audience can experience a sense of immersion into the environment depicted in the video. Video provided by the plurality of projector systems may be projected on the plurality of projection surfaces creating a unified video presentation. Such immersive display systems are capable of generating audiovisual presentations with a relatively high level of realism due at least in part to the quality of the images provided on the plurality of projection surfaces.

However, having multiple projection surfaces can result in light being reflected from a first projection surface to a second projection surface and then to the viewer. This light mixes with the light reflected directly from the first projection surface to the viewer. Such mixing of light on the plurality of projection surfaces can reduce the contrast ratio and/or dynamic range of the projection surfaces, thereby diminishing the quality of the images provided in the immersive display system. This mixing of light can be referred to as cross-talk or cross-reflection and can be a challenge in immersive display systems. This challenge may be even more difficult to overcome for immersive display systems designed for a relatively large group of people, such as in a movie theater, due at least in part to the wide range of viewing angles of the viewers in the audience.

Accordingly, systems and methods are provided herein for immersive display systems that include a plurality of projection surfaces (e.g., screens) that are usable over a wide range of viewing angles and for which a decrease in the contrast ratio and/or dynamic range caused by cross-talk or cross-reflection between different parts of the plurality of projection surfaces is substantially reduced. In some embodiments, the systems and methods disclosed herein provide relatively high-contrast, high-dynamic range immersive viewing of images using two or more curved or plane screens where each screen is switched between a diffuse reflective state or a scattering state and a dark state. When one or more screens are in the diffuse reflective state, the other screens can be in the dark state, and vice versa. The timing of switching between the states can be synchronized with one or more projectors associated with each screen. Accordingly, the images projected by the projectors can be synchronized with the associated screen, such that an image or frame of video is projected when the associated screen is in the diffuse reflective state. A central controller can be configured to control the sequence of the screen switching and the synchronization of the projectors with the screens.

In a first aspect, an immersive display system is provided that includes a first screen comprising a multilayer structure configured to switch between a dark state and a diffuse reflective state. The system includes a second screen comprising a multilayer structure configured to switch between a dark state and a diffuse reflective state. The system includes a third screen comprising a multilayer structure configured to switch between a dark state and a diffuse reflective state. The system includes a first projector system configured to project a first video onto the first screen such that the first projector system is in an active projection state when the first screen is in the diffuse reflective state and in a blank state when the first screen is in the dark state. The system includes a second projector system configured to project a second video onto the second screen such that the second projector system is in an active projection state when the second screen is in the diffuse reflective state and in a blank state when the second screen is in the dark state. The system includes a third projector system configured to project a third video onto the third screen such that the third projector system is in an active projection state when the third screen is in the diffuse reflective state and in a blank state when the third screen is in the dark state. The first screen is configured to be in the dark state when the second screen or the third screen is in the diffuse reflective state. The second screen is configured to be in the dark state when the first screen or the third screen is in the diffuse reflective state. The third screen is configured to be in the dark state when the first screen or the second screen is in the diffuse reflective state. The first screen and the third screen are positioned adjacent to the second screen so that the first video, the second video, and the third video are configured to be simultaneously viewed by a plurality of viewers in an immersive viewing environment.

In some embodiments of the first aspect, the system further includes a controller operably coupled to the first screen, the second screen, the third screen, the first projector, the second projector, and the third projector, the controller configured to provide signals to the first screen, the second screen, and the third screen to switch the respective screens between the dark state and the diffuse reflective state. In a further embodiment, the controller is further configured to provide signals to the first projector system, the second projector system, and the third projector system to switch the respective projector systems between the active projection state and the blank state. In yet a further embodiment, the controller is configured to synchronously switch the respective screens and the respective projector systems at a frequency of at least 60 Hz. In another further embodiment, the controller is configured to synchronously switch the respective projector systems to the active projection state after the associated screens have reached a saturation level of the diffuse reflective state.

In some embodiments of the first aspect, the system includes a sound system positioned behind the first screen. In a further embodiment, the first screen further comprises a plurality of holes configured to allow sound from the sound system to reach the immersive viewing environment.

In some embodiments of the first aspect, the first, second, and third screens are curved.

In some embodiments of the first aspect, the first, second, and third screens include a polymer-dispersed liquid crystal layer and a light-absorbing element. In a further embodiment, the system includes a voltage source configured to deliver voltage to the polymer-dispersed liquid crystal layer to switch the layer from an opaque state to a transparent state.

In a second aspect, a screen for an immersive display system is provided. The screen includes a first layer comprising an anti-reflection element or a glare suppression element configured to suppress specular reflections of light incident on the screen. The screen includes a second layer comprising a transparent substrate having a transparent conductive layer. The screen includes a third layer comprising a polymer-dispersed liquid crystal film, a first side of the third layer adjacent to the transparent conductive layer of the second layer. The screen includes a fourth layer comprising a transparent substrate having a transparent conductive layer adjacent to a second side of the third layer. The screen includes a fifth layer comprising a light-absorbing element configured to absorb visible light. The screen includes a switchable voltage source configured to provide an electric field across the third layer by applying a voltage to the transparent conductive layers of the second and fourth layers.

In some embodiments of the second aspect, the system includes a support substrate. In some embodiments of the second aspect, the system includes an adhesive layer.

In some embodiments of the second aspect, the first layer is adjacent to the second layer, the second layer is adjacent to the third layer, the third layer is adjacent to the fourth layer, and the fourth layer is adjacent to the fifth layer. In some embodiments of the second aspect, the polymer-dispersed liquid crystal film is less than or equal to about 10 µm.

In some embodiments of the second aspect, the polymer-dispersed liquid crystal film switches from an opaque state to a transparent state when the switchable voltage source provides the electric field. In a further embodiment, the polymer-dispersed liquid crystal film switches from the transparent state to the opaque state when the switchable voltage source does not provide the electric field. In yet a further embodiment, a time to switch between the opaque state and the transparent state is less than or equal to about 1 ms.

In some embodiments of the second aspect, the transparent conductive layers of the second and fourth layers comprise indium-tin-oxide, tin oxide, or a conductive polymer.

In some embodiments, an immersive display system includes the screen of the second aspect with a second and a third screen positioned on either side of the screen of the second aspect. The second and third screens each include a first layer comprising an anti-reflection element or a glare suppression element configured to suppress specular reflections of light incident on the screen; a second layer comprising a transparent substrate having a transparent conductive layer, a third layer comprising a polymer-dispersed liquid crystal film, a first side of the third layer adjacent to the transparent conductive layer of the second layer; a fourth layer comprising a transparent substrate having a transparent conductive layer adjacent to a second side of the third layer; a fifth layer comprising a light-absorbing element configured to absorb visible light; and a switchable voltage source configured to provide an electric field across the third layer by applying a voltage to the transparent conductive layers of the second and fourth layers.

BRIEF DESCRIPTION OF THE DRAWINGS

Various embodiments are depicted in the accompanying drawings for illustrative purposes, and should in no way be interpreted as limiting the scope of the inventions. In addition, various features of different disclosed embodiments can be combined to form additional embodiments, which are part of this disclosure. Any feature or structure can be removed or omitted. Throughout the drawings, reference numbers can be reused to indicate correspondence between reference elements.

DETAILED DESCRIPTION

Although certain embodiments and examples are disclosed herein, inventive subject matter extends beyond the specifically disclosed embodiments to other alternative embodiments and/or uses, and to modifications and equivalents thereof. Thus, the scope of the claims appended hereto is not limited by any of the particular embodiments described below. For purposes of comparing various embodiments, certain aspects and advantages of these embodiments are described. Not necessarily all such aspects or advantages are achieved by any particular embodiment. Thus, for example, various embodiments can be carried out in a manner that achieves or optimizes one advantage or group of advantages as taught herein without necessarily achieving other aspects or advantages as can also be taught or suggested herein.

Immersive display systems are capable of generating images with a high level of realism because the images are simultaneously presented to the viewer in many directions. Typical immersive display systems may suffer from a low contrast ratio and a low dynamic range due at least in part to cross-talk or cross-reflection. As used herein, cross-talk and/or cross-reflection refers generally to the situation where light emitted from one part of a screen of an immersive display system is incident on other parts of the screen of the immersive display system and these emitted rays are then partially reflected back to one or more viewers after diffuse reflection. This cross-talk or cross-reflection may arise in typical immersive display systems due at least in part to the screens reflecting substantially all of the light incident thereon. Generally, peripheral light, e.g., light that is not related with the local image projected on the screen or provided by the display, that is incident on a display-screen and that is not absorbed by the display-screen is superimposed on the displayed image resulting in reduced image contrast. Peripheral light or illumination can strongly deteriorate the contrast ratio of the image. Similarly, peripheral light can deteriorate the color saturation of the image and, consequently, the dynamic range of the image. Therefore, it is desirable and advantageous to reduce or minimize reflection of peripheral light in general, and in particular to reduce or minimize cross-talk.

Accordingly, disclosed herein are systems and methods to improve the rejection of peripheral light on front projection screens to thereby enhance the contrast of images generated by front projection. In particular, disclosed herein are time multiplexed screens and projector systems for use in immersive display systems, the screens and projector systems of an immersive display system being time multiplexed to reduce or minimize the effects of cross-talk on projected images.

The systems and methods provided herein are configured to improve contrast ratio and/or dynamic range for immersive display systems having a plurality of projection surfaces with a plurality of projector systems. There may be a number of systems and methods for improving contrast ratio and/or dynamic range that may be combined with the disclosed systems and methods to achieve one or more specific advantages. In some implementations, these systems and methods may have certain shortcomings that the disclosed systems and methods overcome, either on their own or in combination with other systems and methods. For example, a method to improve contrast of an immersive dome theater concentrates the brightness of the image within a central field-of-view of viewers that are unidirectionally seated in the theater. However, this may disadvantageously sacrifice brightness toward the outside edges of the viewer's field-of-view. Another method to improve contrast includes coating the screen with a visually-reflective coating that provides a textured surface and that acts as a micro-baffle to suppress cross-reflection of projected imagery. Another method to improve contrast of a curved, back-projection screen or immersive display includes using a specific tailored or optimized rear-screen coating.

The contrast of a front projection screen can be improved through the use of metal flakes and light absorbing particles distributed in a host material. Similarly, a reflection-type projection screen may include a light-reflecting layer and a transparent light-diffusing layer, the light-reflecting layer comprising a transparent resin with flakes of a light-reflective material dispersed therein and the transparent light-diffusing layer comprising a transparent resin with fine crystalline particles of calcite and achromatic dyes or pigments dispersed therein. Such screens can improve luminance and image contrast while substantially maintaining the same angle of diffusion or without substantially decreasing the angle of diffusion.

Contrast for a front-projection screen can be improved by selective reflection of light in the wavelength range of the image display light and by absorbing ambient light. For example, a screen for use in a front-projection system can include a section configured to reflect light of targeted wavelengths or targeted wavelength ranges, where the reflection is greater than non-targeted wavelengths or non-targeted wavelength ranges. Such a screen can enhance contrast between incident projected light and ambient light. As another example, a selective-reflecting projection screen can include a structure configured to selectively reflect incident optical energy of a number of relatively narrow bands of optical wavelength ranges and to absorb light with wavelengths falling between and/or outside the narrow bands. The projection screen can include a micro-lens structure that focuses incoming light so that when the light is reflected from the screen, it passes through a relatively small spot having high diffusion or beam spreading.

Rejection of ambient light can be improved in a projection screen by configuring the screen to have different reflectivities for different angles of incidence and/or polarizations. For example, ambient light rejection can be improved by configuring a screen to have relatively high reflectivity for light with a relatively low angle of incidence and a polarization parallel to that of the projector, relatively low reflectivity for light with a relatively high angle of incidence and a polarization parallel to that of the projector, and relatively low reflectivity for light with a polarization perpendicular to that of the projector (having either a low or high angle of incidence). A reflective front projection screen can be configured to project an image with enhanced contrast and relatively wide viewing angle in the presence of relatively high levels of ambient light by including a reflective polarizing element in combination with a diffusing element and/or a glare-suppression element. A projection screen can comprise a cholesteric liquid crystalline, polarized-light selective reflection layer to selectively and diffusely reflect a targeted or known polarized-light component. A front projection screen may also be overlaid with a polarized sheet.

A high contrast front projection screen can include a plurality of micro-elements that include surfaces configured to change from a low-reflectivity state to a high-reflectivity state by switching on and off appropriate structures arranged on a substrate. The surface of the micro-elements are in a low-reflectivity state for black segments of a projected image or video and are in a high-reflectivity state for segments that are outside of the black segments of the projected image or video.

A front projection screen can include a lenticular lens sheet overlaying a polarization rotation plate, the polarization plate overlaying a reflective surface, and a polarizing film overlaying the lenticular lens sheet. The polarizing film can include non-polarizing segments at the focal point of each lenticular lens so that light from the projector is relatively un-attenuated by the polarizing film while light from other sources is attenuated. Light from the projector is generally distributed with an aspect ratio of viewing angle equal to that of the lenses in the lenticular lens sheet.

A front projection screen can be overlaid with a plastic sheet filled with polymer-dispersed liquid crystals and having a transparent electrode on both sides of the plastic sheet. The plastic sheet is transparent in a first state and can be turned to white by applying a voltage across the plastic sheet. The plastic sheet can be coated black on a one side so that when no voltage is applied to the electrodes, the screen is black due at least in part to reflected light from the back side of the transparent plastic sheet. When voltage is applied to the electrodes, the screen can turn white during the time that the voltage is applied. The screen can receive pulses of voltage that are synchronized with a pulsing of a projector. In such a scenario, the screen can be configured to be white or to have a relatively high reflectivity during the time that the projector is active, and to be black or to have a relatively low reflectivity when the projector is inactive.

Some screens can have a visually-reflective layer applied to an inner surface of an open-cell foam. The reflective coating can be applied sufficiently thin to not fill and/or block the open-cell foam structure. The reflective coating can coat the inside of the open cells. This can yield a projection surface that reflects most light at near-normal incidence angles, and trap in the open cell light from more oblique incident angels, thereby reducing cross-reflections. The resulting screen includes a micro-baffled screen surface with a relatively high degree of directionality and with a relatively rapid angular cut-off. However, this design may be undesirable and/or disadvantageous in an immersive display system where a wide range of viewing angles with the same or almost the same luminance is desired or preferable. This may also be undesirable and/or disadvantageous in an immersive display system where a smooth and gradual decrease in luminance as a function of viewing angle is desired or preferable.

The above systems and methods can be used to enhance the contrast of immersive display systems by reducing cross-reflection, but may suffer from some disadvantages that are overcome by the systems and methods described herein. In particular, some embodiments disclosed herein provide for an immersive display system that suppresses cross-reflection and that has a targeted or desired luminance as a function of viewing angle (e.g., a smooth and gradual decrease in luminance as a function of viewing angle).

Some of the above-described screen designs assume that viewers use the same or similar central field-of-view. This may be disadvantageous because it restricts the use of the immersive display system. Some of the above-described issues may be addressed by the systems and methods disclosed herein. In particular, an immersive display system is described that suppresses cross-reflection while providing a substantial improvement to contrast where viewing directions are allowed to expand beyond a common central field-of-view. Such an immersive display system can be used in more situations and configurations because it provides an improved viewing experience for a larger audience.

Some of the above-described systems and methods configured to enhance contrast for front-projection systems are aimed at rejecting ambient light for use with individual front projectors. Such systems and methods may not be effective for suppressing cross-reflection and improving contrast for ensembles of projectors configured to project images on multiple front and/or rear projection screens. In such immersive display systems with multiple projectors and/or screens, the relative screen orientations and optical screen characteristics may produce cross-reflections which reduce contrast and/or color saturation of projected images. Accordingly, one or more of the embodiments disclosed herein include an immersive display system that effectively suppresses cross-reflection.

Immersive Display System

Figure 1A:
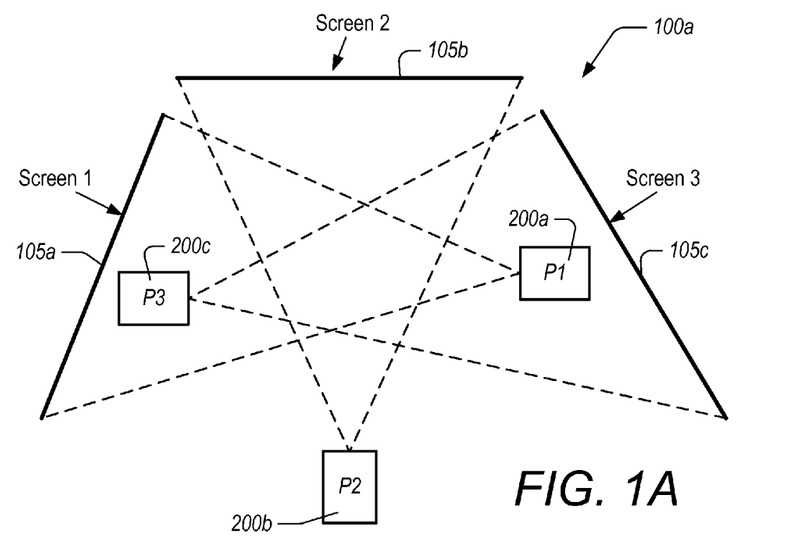
FIGS. 1A and 1B illustrate example immersive display systems for providing an immersive display experience.
Figure 1B:
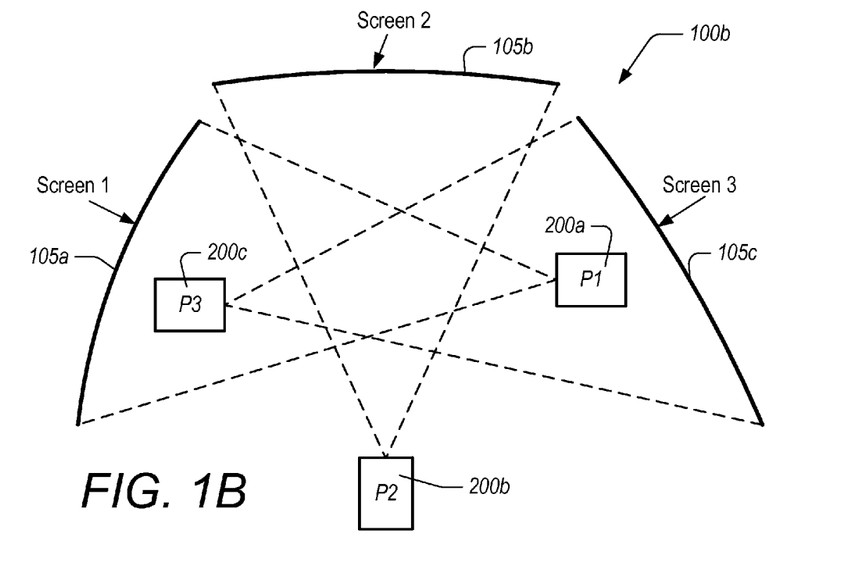

FIGS. 1A and 1B illustrate example immersive display systems 100a, 100b comprising a plurality of projectors 200a, 200b, 200c configured to project images onto corresponding screens 105a, 105b, 105c for providing an immersive display experience. The screens 105a-105c can be planar front-projection displays, as illustrated in FIG. 1A, or curved front-projection displays, as illustrated in FIG. 1B. There can be gaps between adjacent displays. For example, screens 105a-c can have gaps between them as depicted in FIGS. 1A and 1B. In some embodiments, the gaps can be relatively small, close to zero, or zero. The immersive display systems 100a, 100b can include a plurality of flat or curved displays or screens or it can include a single curved display or screen. The screens can be rotated relative to one another. The screens 105a-c can also have respective inclinations relative to one another. The screens 105a-c of the immersive display systems 100a, 100b can include flat screens, curved screens, or a combination of both.

The example immersive display systems 100a, 100b includes three front-projection screens 105a-c wherein the image on each screen is provided by a projector system. Projector system 200a is configured to project video onto screen 105a, projector system 200b is configured to project video onto screen 105b, and projector system 200c is configured to project video onto screen 105c. Sound systems may be mounted behind screen 105a, screen 105b and/or screen 105c. The light emitted by the projector systems P1, P2 and P3 can have desired or selected polarization states or can be randomly polarized.

In some embodiments, the screens 105a-c can be curved screens, an example of which is illustrated in FIG. 1B. The considered curvature can be in the plane of the paper, in a plane perpendicular to the plane of the paper, or in both the plane of the paper and in a plane perpendicular to the paper. This immersive display system 100b, for example, comprises three curved front-projection screens 105a-c, and the image on each screen is projected from one or more projectors. For example, projector system P1 200a can be one or more projectors projecting the image on screen 1 105a, projector system P2 200b can be one or more projectors projecting the image on screen 2 105b, and projector system P3 200c can be one or more projectors projecting the image on screen 3 105c.

Light emerging from the projector systems 200a-c can each have different spectra. This may result in color differences between the images provided by these projector systems. These color differences can be electronically compensated. An example method for compensating color differences between two projectors is disclosed in U.S. Pat. Pub. No. 2007/0127121 to B. Maximus et al., which is incorporated by reference herein in its entirety. The spectra of the projector systems 200a-c can be configured to project, after electronic compensation, color images with a color gamut according to Rec. 709 or DCI P3, for example.

The projector systems 200a-c refer to devices configured to project video on the screens 150a-c. These projector systems 200a-c can include a media server and a projector. In some embodiments, the media server is physically separate from the projector and is communicably coupled (e.g., through wired or wireless connections) to the projector. In some embodiments, the projector system comprises an integrated media server and projector. The media server portion of the projector system can include hardware and software components configured to receive, store, and decode media content. The media server can include hardware and software configured to ingest and decode digital content files, to produce a media stream (e.g., video and audio), to send image data to the projector. The media server can include modules for ingesting digital content, decoding ingested content, generating video from the decoded content, generating audio from the decoded content, providing security credentials to access secure content, and to generate or interpret synchronization signals to provide a synchronized presentation, and the like. The projector can include an optical engine, a modulation element, optics, and the like to enable the projector to produce, modulate, and project an image. For example, the projector may be implemented using a cathode ray tube (CRT), a liquid crystal display (LCD), digital light processing (DLP), digital micro-mirror devices (DMD), etc.

The projector systems 200a-c can be configured to provide video with an aspect ratio and resolution conforming to any of a number of standards including, for example and without limitation, 4K (e.g., 3636×2664, 3996×2160, 3840×2160, 4096×2160, etc.), 2K (e.g., 1828×1332, 1998×1080), HD (e.g., 1920×1080, 1280×720), or the like. The projector systems 200a-c can be configured to provide video with a variety of frame rates including, for example and without limitation, 24 fps, 30 fps, 60 fps, 120 fps, etc. The projector systems 200a-c can be configured to display synchronized 3D content (e.g., stereoscopic video) on two or more screens.

As an example, the immersive display systems 100a, 100b can include DCI-compliant projector systems 200a-c configured to play DCI-compliant content inside a movie theater. The DCI-compliant content can include a media stream (e.g., video data or video and audio data extracted from digital content). In some implementations, the media stream is provided as a digital cinema package ("DCP") comprising compressed, encrypted, and packaged data for distribution to movie theaters, for example. The data can include a digital cinema distribution master ("DCDM") comprising the image structure, audio structure, subtitle structure, and the like mapped to data file formats. The data can include picture essence files and audio essence files that make up the audiovisual presentation in the DCP. The DCP can include a composition which includes all of the essence and metadata required for a single digital presentation of a feature, trailer, advertisement, logo, or the like. The projector systems 200a-c can be configured to ingest the DCP and generate a visually indistinguishable copy of the DCDM and then use that copy of the DCDM to generate image and sound for presentation to an audience.

FIGS. 1A and 1B illustrate three projector systems 200a-c and three screens 105a-c. However, the immersive display system can include a different number of projector systems and/or screens. For example, the immersive display systems 100a, 100b can include 2, 3, 4, 5, 6, 7, 8, 9, 10, or more than 10 projector systems. The immersive display systems 100a, 100b can include 2, 3, 4, 5, 6, 7, 8, 9, 10, or more than 10 screens. The immersive display systems 100a, 100b can be configured such that more than one projector system provides video on a single screen, such that the images substantially overlap. The immersive display systems 100a, 100b can be configured such that projector systems provide video on a single screen wherein the videos from projector systems minimally overlap, are adjacent to one another, or are near one another to provide a substantially unitary video presentation.

The sound in an immersive display system can be important, and may be of comparable importance to the visual information. Typical immersive display systems may experience problems with audio or acoustics based at least in part on the viewing surface acting as an acoustic reflector. This can result in undesirable and/or unwanted echoes and reverberations of sounds within the immersive environment. In some implementations, the immersive display systems 100a, 100b include perforated display screens 105a, 105b, and/or 105c to reduce this problem. Perforated display screens can be configured to allow sound within the immersive environment to escape the environment and to allow sound from speakers behind the screens to enter the immersive environment. This can reduce or eliminate unwanted or undesirable echoes and reverberations while increasing the desired sound within the immersive environment.

Sound systems may be mounted behind the front projection screen 1 105a, screen 2 105b and/or screen 3 105c. To reduce attenuation of high frequency sound waves, arrays of perforations (e.g. circular holes) may be used. The perforation in a screen may be laid out so that the centers of the holes are equidistant in, for example and without limitation, a staggered or straight hole arrangement. The number of equidistant circular holes per unit area, the hole diameter, and/or the screen thickness are parameters that can be tuned to achieve acceptable or suitable transmission loss at frequencies larger than about 1 kHz.

Example Immersive Display System Screens

Figure 2A:
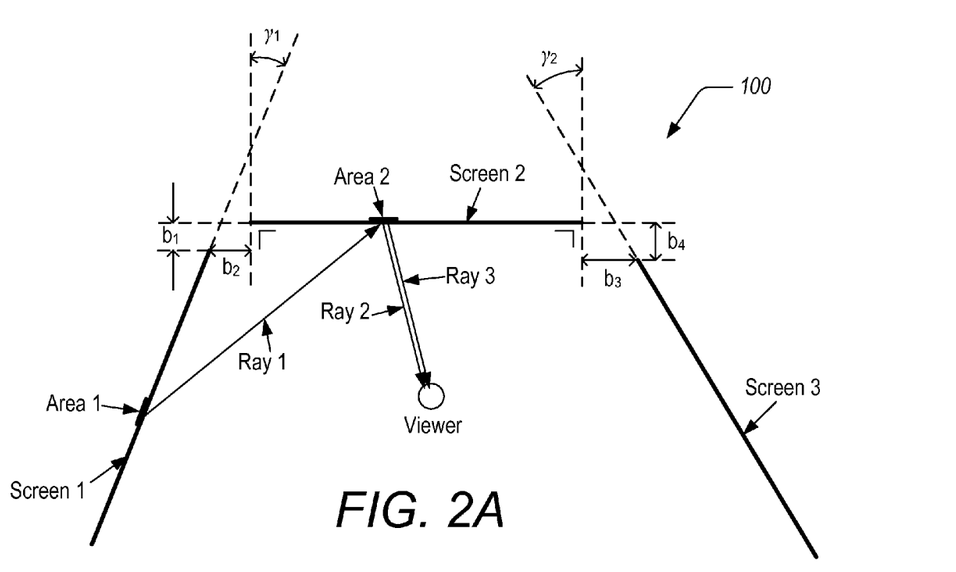
FIGS. 2A and 2B illustrate examples of immersive display systems comprising three screens, and illustrate examples of cross-talk in such immersive display systems.
Figure 2B:
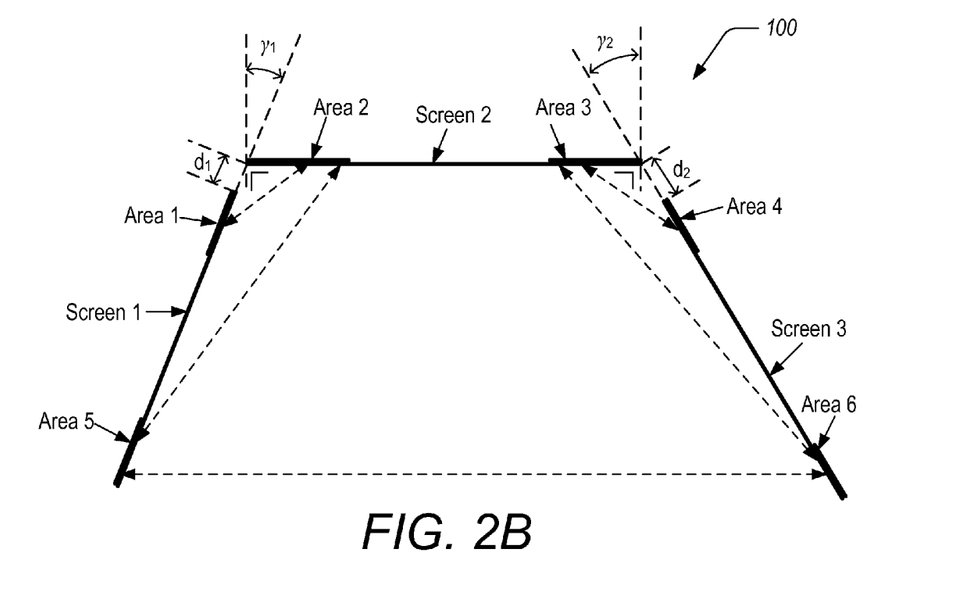

FIGS. 2A and 2B illustrate examples of immersive display systems 100 comprising three screens, and illustrate examples of cross-talk in such immersive display systems. An immersive display system 100 can include a plurality of screens. The screens can be arranged such that there are gaps between adjacent displays. For example, the immersive display system 100 illustrated in FIG. 2A can have gaps $b_1$, $b_2$, $b_3$, and $b_4$, and the immersive display system 100 illustrated in FIG. 2B can have gaps $d_1$ and $d_2$. In some embodiments, the gaps can be relatively small, close to zero, or zero. The screens can have a relative orientation characterized, for example, by angles $\gamma_1$ and $\gamma_2$. Screens 1, 2 and 3 can also have respective inclinations corresponding to angles $\gamma_3$, $\gamma_4$, and $\gamma_5$, where the angles are measured with respect to a direction perpendicular to the plane of the paper.

With reference to FIG. 2A, Ray 1 represents reflected light from an image projected onto Screen 1, Ray 1 reflected from Area 1 and incident on Area 2 of Screen 2. Ray 3 represents reflected light from an image projected onto Screen 2 at Area 2 that reaches a viewer. Ray 2 represents reflected light from Ray 1 at Area 2 on Screen 2. In the absence of Ray 1, Ray 3 is reflected by Screen 2 to the viewer, Ray 3 being part of the original image. Where there is cross-talk from Area 1 onto Area 2, however, Ray 2 is also perceived by the viewer. The mixture of Ray 2 and Ray 3 is referred to as cross-talk and can substantially reduce the contrast ratio and the color saturation of the original images, consequently reducing the dynamic range of the original images.

FIG. 2B illustrates another example of cross-talk, where intensity can depend on a distance between areas that are mutually illuminated. For example, the immersive display system 100 includes multiple adjacent or almost adjacent screens, the cross-talk may be pronounced on the parts of the screens that can illuminate each other from a relatively short distance and for screen-configurations where the angle between the screens is relatively small. As the distance between the considered screen areas increases, the illuminance caused by the cross-talk decreases (e.g., approximated by an inverse square law), and when the angle between the screens increases the illuminance also decreases (e.g., approximated by the cosine law of illumination). For example, for the immersive display system 100, the crosstalk between Area 1 and Area 2 or between Area 3 and Area 4 will be more intense than between Area 2 and Area 5, between Area 3 and Area 6, or between Area 5 and Area 6.

To illustrate the effect of cross-talk on contrast ratio, a simple example will be provided. Contrast ratio is related to the quality of a display system. The full-on/full-off contrast ratio (e.g., sequential contrast ratio) can be defined as a ratio of maximum luminance to minimum luminance. Maximum luminance, $L_{max}$, can be a luminance value output by a display that is driven with a 100% white signal, and minimum luminance, $L_{min}$, can be a luminance value output by a display that is driven with a 0% white level (e.g., a black level).

$$C_{on\,off} = \frac{L_{max}}{L_{min}}$$

The measured luminance in general depends on the observation angle and the contrast ratio is generally a function of the observation angle. Where there is peripheral illumination incident on the screen of the display, it may be partially reflected towards the viewer and added to the luminance from the display. With a non-zero peripheral illumination, the full-on/full-off contrast ratio is:

$$C_{on\,off} = \frac{L_{max} + L_a}{L_{min} + L_a}$$

where $L_a$ corresponds to the peripheral illumination and the reflection characteristics of the display screen.

Another method to characterize the contrast ratio of a display is sometimes referred to as the 'checkerboard method,' and is prescribed in ANSI 1992, IEC 2002. In this method, a 4×4 checkerboard pattern of black and white rectangles that covers the complete image area of the display is used. The luminance at the center of each rectangle is measured. The eight white values are averaged, $\langle L_{cb,max} \rangle$, and the eight black values are averaged, $\langle L_{cb,min} \rangle$. The contrast, sometimes referred to as ANSI contrast ratio, is then:

$$C_{ANSI} = \frac{\langle L_{cb,max} \rangle}{\langle L_{cb,min} \rangle}$$

The ANSI contrast ratio can generally depend on the observation angle; and, if the peripheral illumination is non-zero, that non-zero illumination may also influence the measured ANSI contrast ratio:

$$C_{ANSI} = \frac{\langle L_{cb,max} \rangle + L_a}{\langle L_{cb,min} \rangle + L_a}$$

Values for projection displays are provided to give some example values for contrast ratios (e.g., $C_{onoff}$ and $C_{ANSI}$). As demonstrated by these values, the contrast ratio can greatly reduce where there is peripheral illumination. A first example projection display has a maximum luminance, measured in a direction orthogonal to the screen, of 500 $cd/m^2$ and a minimum luminance of 0.25 $cd/m^2$, giving a full-on/full-off contrast ratio of 2000:1 when the peripheral light is zero. If, instead, there is incident peripheral light that is reflected to the observer and that reflected peripheral light adds 5 $cd/m^2$, then the full-on/full-off contrast ratio is reduced to ~96:1. For a typical projection display, the ANSI contrast ratio is lower than the full-on/full-off contrast ratio and can be, for example, ~200:1. For the same reflection of the peripheral light described in this paragraph, the ANSI contrast ratio is reduced to ~67:1.

Example Time Multiplexed Screens and Projector Systems

Figure 3:
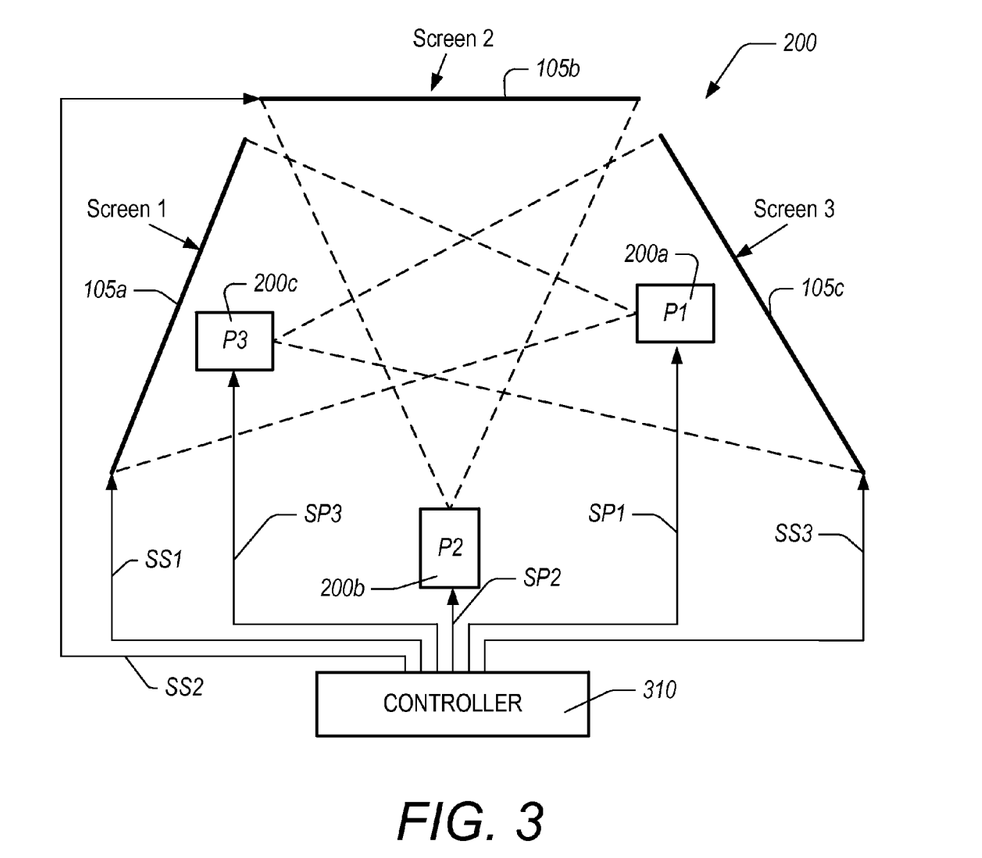
FIG. 3 illustrates an example immersive display system having a controller configured to provide signals to the screens and projector systems of the immersive display system for time multiplexing purposes.

With reference to FIG. 3, screens 1, 2, and 3 can be switched from a dark state (e.g., a state where the screen absorbs substantially all light within one or more wavelength ranges) to a diffuse reflective state (e.g., a state where the screen reflects or scatters substantially all light within one or more wavelength ranges) in response to respective signals SS1, SS2, and SS3, generated by a controller 310. When SS1=1, for example, screen 1 is in the diffuse reflective state, and when SS1=0 screen 1 is in the dark state. Similarly, when SS2=1 screen 2 is in the diffuse reflective state, and when SS2=0 screen 2 is in the dark state. Likewise, when SS3=1 screen 3 is in the diffuse reflective state, and when SS3=0 screen 3 is in the dark state.

The projector systems P1, P2, and P3 can be switched from an active projection state to a blank state with respective signals SP1, SP2 and SP3, generated by the controller C. The blank state or dark state of a projector system corresponds to a state where no images are projected by the projector system onto a screen and light output of the projector system is substantially low.

Figure 4:
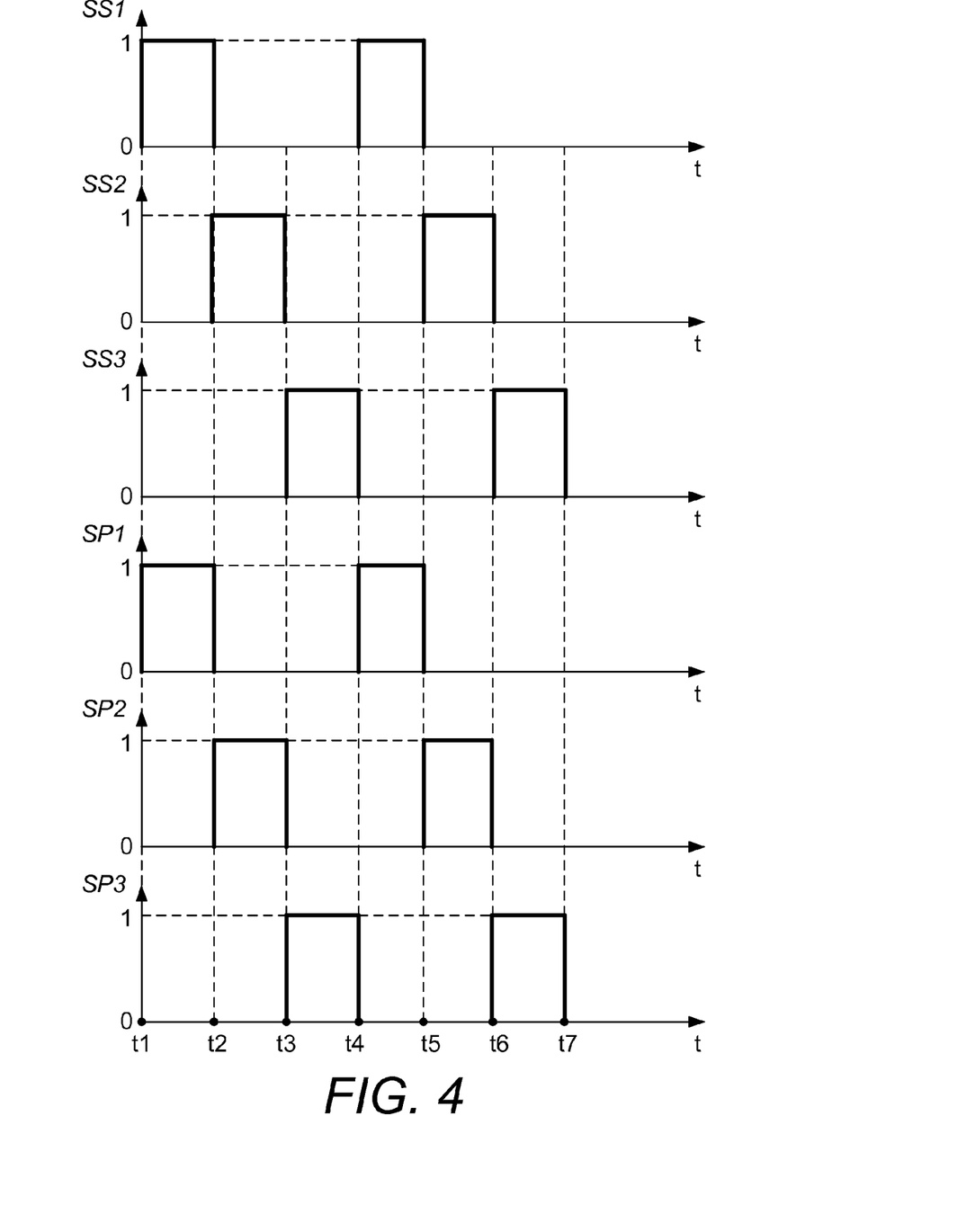
FIG. 4 illustrates an example timing diagram for when respective screens and projector systems are controlled to be in a diffusely reflective state and an active state, respectively.

As an example, screen 1 can be in the dark state during time intervals $t_2 < t < t_4$ and $t_5 < t < t_7$, and in the diffuse reflecting state during other time intervals $t_1 < t < t_2$ and $t_4 < t < t_5$, an example of which is illustrated in FIG. 4. Projector system P1 can project one or more image frames onto screen 1 during the time intervals when screen 1 is in the diffuse reflective state, and projector system P1 can be blanked during the time intervals when screen 1 is in the dark state.

Similarly, screen 2 can be in the dark state during time intervals $t_1 < t < t_2$ and $t_3 < t < t_5$ and $t_6 < t < t_7$, and in the diffuse reflective state during other time intervals $t_2 < t < t_3$ and $t_5 < t < t_6$. Projector system P2 can project one or more image frames onto screen 2 during the time intervals when screen 2 is in the diffuse reflective state, and projector system P2 can be blanked during the time intervals when screen 2 is in the dark state.

Likewise, screen 3 can be in the dark state during time intervals $t_1 < t < t_3$ and $t_4 < t < t_6$, and in the diffuse reflective state during other time intervals $t_3 < t < t_4$ and $t_6 < t < t_7$. Projector system P3 can project one or more image frames onto screen 3 during the time intervals when screen 3 is in the diffuse reflective state, and projector system P3 can be blanked during the time intervals when screen 3 is in the dark state.

Using the above described switching scheme of screens and projectors, cross reflections from screen 1 onto screen 2 and screen 3 can be absorbed by screen 2 and screen 3 during the time intervals $t_1 < t < t_2$ and $t_4 < t < t_5$. During these two time intervals there can be image content projected onto screen 1 and not onto screens 2 and 3. Cross reflections from screen 2 onto screen 1 and screen 3 can be absorbed by screen 1 and screen 3 during the time intervals $t_2 < t < t_3$ and $t_5 < t < t_6$. During these two time intervals there is image content projected onto screen 2 and not onto screens 1 and 3. Cross reflections from screen 3 onto screen 1 and screen 2 can be absorbed by screen 1 and screen 2 during the time intervals $t_3<t<t_4$ and $t_6<t<t_7$. During these two time intervals there is image content projected onto screen 3 and not onto screens 1 and 2.

Temporal Vision

If the temporal frequency at which the luminance of a surface varies is sufficiently high, it appears constant, while if the frequency is too low, it appears to flicker. The point of transition between these two conditions may be referred to as the critical fusion frequency or critical flicker frequency. The sensitivity to flicker of the human visual system depends on a number of factors. The sensitivity to temporal luminance modulation (e.g., flicker) increases with increasing luminance, for example. Sensitivity to temporal modulation may depend also on size and eccentricity, and these two factors interact. Small surfaces having greater eccentricity may be less sensitive to flicker while for large areas, greater eccentricity results in increased sensitivity to flicker.

Detection of flicker is substantially reduced or eliminated above about 75 Hz to about 80 Hz. Typical display systems operate at a refresh rate of 60 Hz, for example. Traditional cinema 35 mm film projection operates at 24 frames per second—because motion is perceived continuous at 25 to 30 frames per second—but each frame is typically shown twice (48 Hz) to achieve an acceptable low flicker level. Movie theatres are usually operating at a screen luminance of approximately 50 cd/m$^2$.

The Talbot-Plateau Law states that if the temporal frequency at which the luminance of a surface varies is higher than the critical flicker frequency, then the perceived luminance of that surface will be equal to that of a steady luminance source which has the same luminance as the time-averaged luminance value of the varying luminance surface.

Figure 5:
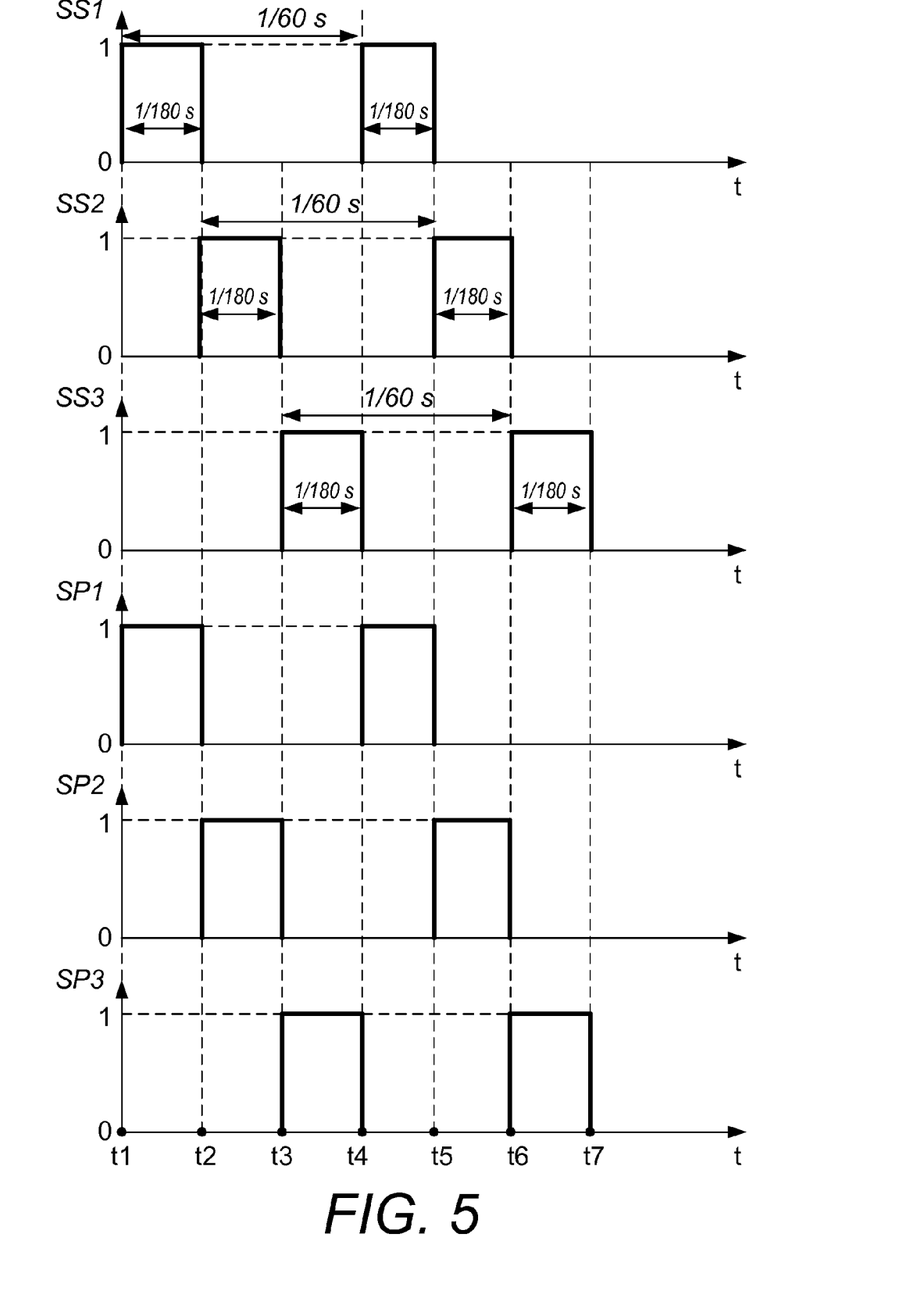
FIG. 5 illustrates a particular example of the timing diagram of FIG. 4 where the screens and projector systems are controlled at 60 Hz.

The screens and projectors can for instance synchronously be switched at a frequency of 60 Hz, as illustrated in FIG. 5. For a configuration of 3 screens where there is equal time intervals for the three 3 screens and the 3 projectors to be in the diffuse reflective state, a complete frame can be shown during a time of 1/180 s or about 5.56 ms.

Figure 6:
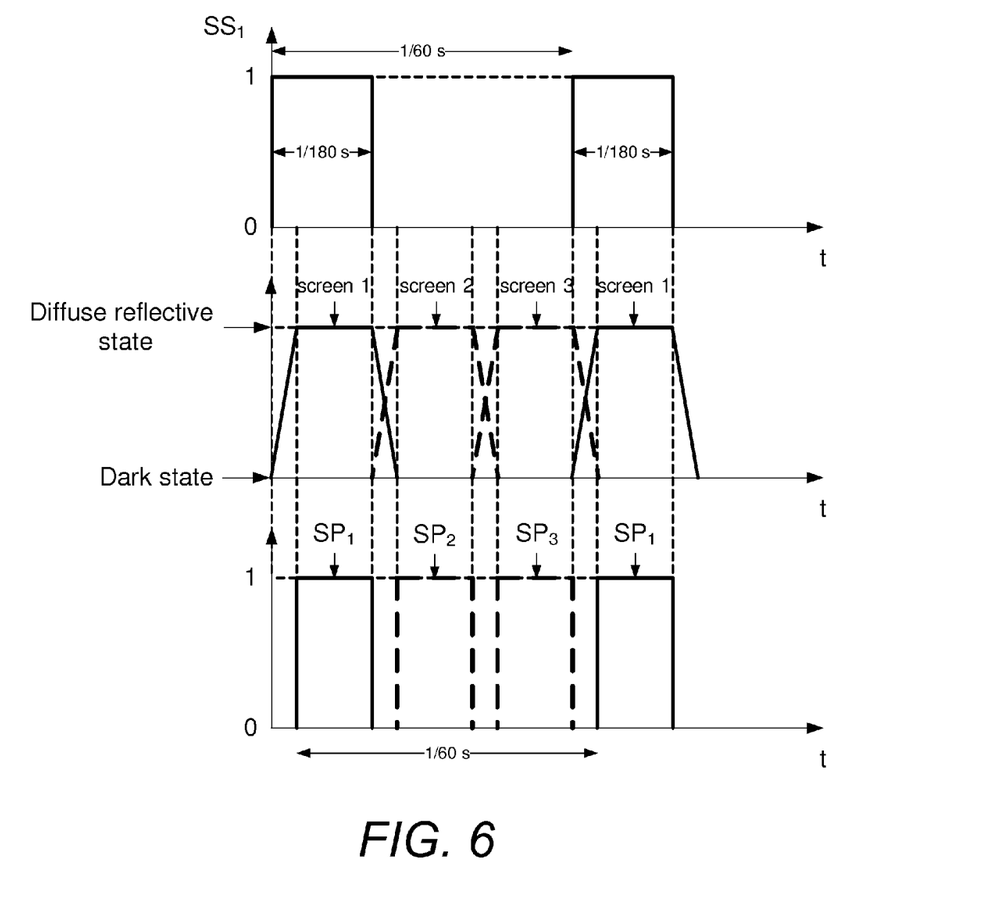
FIG. 6 illustrates an example timing diagram for when projector systems are controlled to be in an active state based on when the associated screen reaches a saturation level for the diffuse reflective state.

Another operating modus is to switch the screens and the projectors synchronously at 60 Hz but to bring the projectors in the active projection state after the associated screens reached the saturation level of the diffuse reflective state. This may be advantageous for some screen technologies that have a transition time from the dark state to the diffuse reflective state and from the diffuse reflective state to the dark state that is significant (e.g., not negligible) compared with the time interval that the screens are driven in the diffuse reflective state. This may reduce or avoid cross-reflections from projector system P2 from reaching the viewers via screen 1 during the transition period of screen 1, for example. The same may also be valid for the other cross-reflections. An example of this timing is illustrated in FIG. 6 where the projectors are switched to the active projection state after the associated screens have reached the saturation level of the diffuse reflective state.

The screens 1, 2 and 3 that are configured to be switched from the dark state to the diffuse reflective state and from the diffuse reflective state to the dark state can be made, for example, with a multi-layer screen structure containing a polymer-dispersed liquid crystal layer and a light-absorbing element. Polymer dispersed liquid crystals (PDLC) form a class of materials which have use in several types of displays, switchable windows, and other light shutter devices. The PDLC can comprise micron-size droplets of nematic liquid crystal encapsulated in a polymer binder. When a film of PDLC material, about 10 µm in thickness, is sandwiched between substrates with transparent conductive layers on the inner surface—such as indium-tin-oxide, tin oxide, or certain conductive polymers—it can be made to switch from the opaque to a clear transparent state upon the application of a voltage between the electrodes. As the voltage applied on the PDLC film is increased, the transparency will increase until a saturation level is reached. The liquid crystal mixture can have an ordinary index of refraction, denoted $n_o$, matching the index of refraction of the polymer binder, denoted $n_p$, and an extraordinary index of refraction, denoted $n_e$, which differs from the index of refraction of the polymer binder, $n_p$.

When no electric field is applied, the nematic liquid crystal molecules in the droplet are generally randomly oriented. In this situation the effective refractive index of the liquid crystal molecule droplets is larger than the refractive index of the adjacent polymer, providing a spatial variation of the refractive index in the material that can cause a relatively strong scattering of light. The PDLC film can have a white opaque appearance when in this scattering state. When an electric field is applied and the applied voltage is higher than a threshold voltage, the liquid crystal molecules can realign along the direction of the electric field. In this case, the effective refractive index of the liquid crystal droplet is the ordinary index of refraction and is parallel with the polymer molecules. This substantially reduces the light scattering caused by the droplets due at least in part to the ordinary index of refraction matching the index of refraction of the polymer. This can be referred to as the transparent state. Upon removal of the voltage, the droplets can return to their originally scattering orientation. The switching time from the opaque state to the transparent state can be referred to as turn on time, $\tau_{ON}$. The switching time from the transparent state to the opaque state can be referred to as relaxation time or turn off time, $\tau_{OFF}$.

The relaxation time or turn off time $\tau_{OFF}$ can be proportional to the rotational viscosity $\gamma_1$ and the square of the droplet size a, inversely proportional with the effective elastic constant K, and the square of the aspect ratio l of the droplets.

$$\tau_{OFF} = \frac{\gamma_1 a^2}{K(l^2-1)}$$

The turn on time $\tau_{ON}$ can be shortened by increasing the applied voltage.

$$\tau_{ON} = \frac{\gamma_1}{\epsilon_0 \Delta \epsilon E^2 + K\frac{(l^2-1)}{a^2}}$$

Typically a PDLC has a short turn on time $\tau_{ON}$ and a long turn off time $\tau_{OFF}$ in which two relaxation times can be distinguished. One of these is observed as a short decay following the removal of the applied voltage. Following this short decay a longer decay is often observed. The longer decay can be eliminated by distorting the droplet (e.g., increasing its aspect ratio l) from its approximate spherical shape. This can be done, for example, by stretching the film.

As shown in TABLE 1 below $\tau_{ON}$ and $\tau_{OFF}$ of less than about 1 ms can be realized with appropriate choices of the nematic liquid crystal mixture, droplet size, droplet aspect ratio, film thickness, and/or applied voltage.

TABLE 1

| rotational viscosity | $\gamma_1$ | 0.1 | Pa s |
|---|---|---|---|
| vacuum permittivity | $\varepsilon_0$ | $8.8542 * 10^{-12}$ | F m$^{-1}$ |
| dielectric anisotropy | $\Delta\varepsilon$ | 14 | — |
| voltage | U | 5 | V |
| film thickness | d | 10 | µm |
| effective elastic constant | K | 10 | pN |
| aspect ratio droplets | l | 1.4 | — |
| radius droplets | a | 0.3 | µm |
| turn off time | $\tau_{OFF}$ | 0.73 | ms |
| turn on time | $\tau_{ON}$ | 0.94 | ms |

A rear projection screen can include a polymer dispersed liquid crystal unit to make the gain of the rear projection screen variable. A switchable lens/diffuser, using a layer of polymer dispersed liquid crystal material having a clear state and a diffusing state, can be electrically switched between an optical component state and a diffuser state.

A screen and image display system can include a polymer dispersed liquid crystal layer with a polymer having a twist angle. When an electric field does not act on the polymer dispersed liquid crystal layer then the screen can be in a first state in which the polymer dispersed liquid crystal layer transmits light. When an electric field acts on the polymer dispersed liquid crystal layer then this layer can change to a second state in which the polymer dispersed liquid crystal layer scatters light incident on the polymer dispersed liquid crystal layer. In some embodiments, a so-called 'reverse type' PDLC can be used. In the second state the polymer dispersed liquid crystal layer has anisotropy of scattering intensity of light incident on the polymer dispersed liquid crystal layer.

An encapsulated nematic liquid crystal material can be used in liquid crystal devices such as relatively large visual display devices.

In some embodiments, diagonal PDLC light valves can have dimensions of at least about 640×480 pixels.

An eye-contact display and camera system for video telephony can include a video camera that looks through a conventional active matrix liquid crystal display and color triads can be projected through the LCD onto a PDLC shutter that acts as a switchable screen.

Liquid crystal light valves using polymer-dispersed liquid crystals can be used to provide some advantages, such as an absence of polarizers, high optical transmission, relatively short switching times, relatively high image uniformity, and ease of fabrication.

Example Screens with Multi-Layer Structure

Figure 7A:
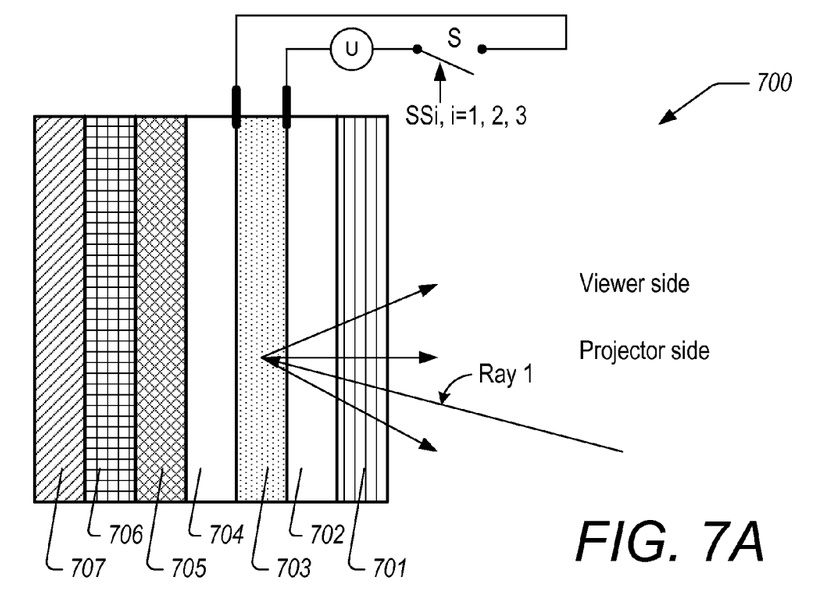
FIGS. 7A and 7B illustrate a screen having a multi-layered structure with an active layer configured to change from an opaque state to a transparent state based on an applied electrical voltage.

FIG. 7A illustrates an example screen 700 having a multi-layer structure, wherein the screen 700 is a front projection screen in the scattering state. The screen includes multiple layers including an anti-reflection element or glare-suppression element 701, transparent substrates 702, 704 with a transparent conductive layer on the inner side, a PDLC layer 703 in the diffuse reflective state (e.g., because no electric field is applied to the PDLC layer 703), a light absorbing element 705, an optional support substrate 706, and an optional adhesive layer 707. Ray 1 represents incident light which is strongly scattered by the PDLC layer 703 due at least in part to no electric field being applied and the nematic droplets of the PDLC layer 703 strongly scattering the incident light.

The PDLC layer 703 includes an electrically controllable PDLC film. The PDLC film can have a thickness of, for example and without limitation, 10 µm and can be sandwiched between two the transparent substrates 702 and 704, each of which may have a transparent conductive layer—such as indium-tin-oxide, tin oxide or certain conductive polymers—on the inner side. These transparent conductive layers can be connected to a switchable voltage source U. When no electric field is applied on the PDLC film—this is the case when the switch S is open—then the PDLC film is in the diffuse reflection state. The construction of the PDLC film can be tailored for a relatively strong diffuse reflection, such that light that is forward scattered can be absorbed by the light absorbing element 705. In this state the images projected on the multi-layer screen 700 can be visible over a relatively large range of viewing angles.

Figure 7B:
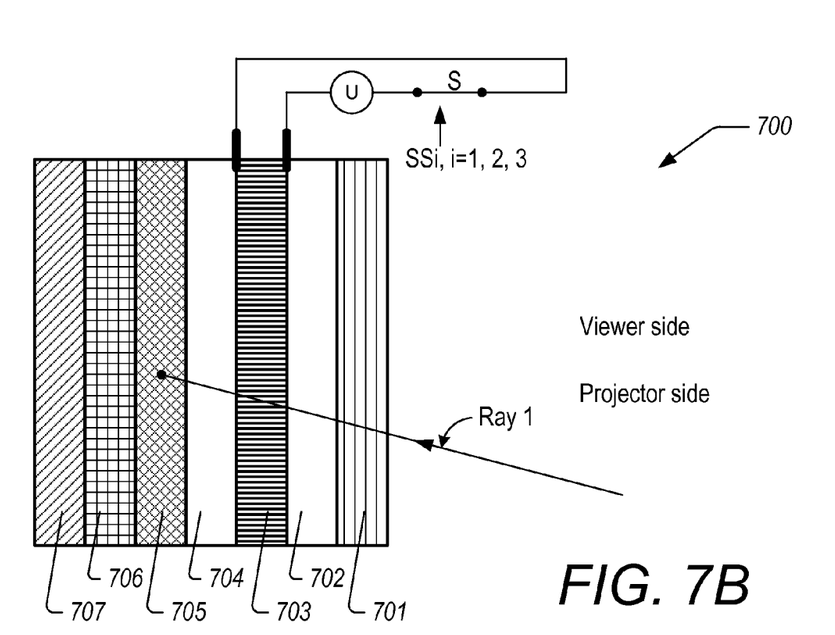

FIG. 7B illustrates the screen 700 in a dark state. In the dark state, the PDLC layer 703 is in the transparent state due at least in part to a sufficiently high electric field being applied to the PDLC layer 703. Ray 1 represents incident light which is transmitted through the PDLC layer 703 due at least in part to a sufficiently high electric field being applied to the PDLC layer and the nematic droplets of the PDLC layer transmitting the incident light. The light can be absorbed by the absorbing element 705.

When the switch S is closed then an electric field with magnitude U/d can be created across the PDLC film in the PDLC layer 703. When this field is sufficiently high, the PDLC film can switch from the diffuse reflective state to the transparent state. The switching time is called $\tau_{ON}$ and can be less than about one millisecond based at least in part on the parameters of the PDLC film and the applied voltage. The incident light rays can propagate through the PDLC film and can be absorbed by the light absorbing element 705. Little or no scattering of light may occur in the PDLC layer 703 and the cross-reflected light rays from the other screens of the immersive display system may not reach the viewers when the respective projection screen is in the dark state.

CONCLUSION

The various features described above may be used independently of one another, or may be combined in various ways. All possible combinations and sub-combinations are intended to fall within the scope of this disclosure. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, is not generally intended to imply that features, elements and/or steps are required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present. The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a result (e.g., measurement value) is close to a targeted value, where close can mean, for example, the result is within 80% of the value, within 90% of the value, within 95% of the value, or within 99% of the value.

While certain example embodiments have been described, these embodiments have been presented by way of example only, and are not intended to limit the scope of the inventions disclosed herein. Thus, nothing in the foregoing description is intended to imply that any particular feature or characteristic is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. An immersive display system comprising:
   a first screen comprising a multilayer structure, the multilayer structure configured to switch between a dark absorptive state and a diffuse reflective state;
   a second screen comprising a multilayer structure, the multilayer structure configured to switch between a dark absorptive state and a diffuse reflective state;
   a third screen comprising a multilayer structure, the multilayer structure configured to switch between a dark absorptive state and a diffuse reflective state;
   a first projector system configured to project a first video onto the first screen and synchronize the projection of the first video with the state of the first screen, wherein the first projector system is capable of (i) projecting the first video when the first screen is in the diffuse reflective state and (ii) not projecting the first video when the first screen is in the dark absorptive state;
   a second projector system configured to project a second video onto the second screen and synchronize the projection of the second video with the state of the second screen, wherein the second projector system is capable of (i) projecting the second video when the second screen is in the diffuse reflective state and (ii) not projecting the second video when the second screen is in the dark absorptive state; and
   a third projector system configured to project a third video onto the third screen and synchronize the projection of the third video with the state of the third screen, wherein the third projector system is capable of (i) projecting the third video when the third screen is in the diffuse reflective state and (ii) not projecting the third video when the third screen is in the dark absorptive state,
   wherein the first screen is configured to be in the dark absorptive state when the second screen or the third screen is in the diffuse reflective state,
   wherein the second screen is configured to be in the dark absorptive state when the first screen or the third screen is in the diffuse reflective state,
   wherein the third screen is configured to be in the dark absorptive state when the first screen or the second screen is in the diffuse reflective state, and
   wherein the first screen and the third screen are positioned adjacent to the second screen so that the first video, the second video, and the third video are configured to be simultaneously viewed by a plurality of viewers in an immersive viewing environment.

2. The immersive display system of claim 1, further comprising a controller operably coupled to the first screen, the second screen, the third screen, the first projector, the second projector, and the third projector, the controller configured to provide signals to the first screen, the second screen, and the third screen to switch the respective screens between the dark absorptive state and the diffuse reflective state.

3. The immersive display system of claim 2, wherein the controller is further configured to provide signals to the first projector system, the second projector system, and the third projector system to switch the respective projector systems between the projecting and not projecting the respective videos.

4. The immersive display system of claim 3, wherein the controller is configured to synchronously switch the respective screens and the respective projector systems at a frequency of at least 60 Hz.

5. The immersive display system of claim 3, wherein the controller is configured to synchronously switch the respective projector systems to the projecting the respective video after the associated screens have reached a saturation level of the diffuse reflective state.

6. The immersive display system of claim 1, further comprising a sound system positioned behind the first screen.

7. The immersive display system of claim 6, wherein the first screen further comprises a plurality of holes configured to allow sound from the sound system to reach the immersive viewing environment.

8. The immersive display system of claim 1, wherein the first, second, and third screens are curved.

9. The immersive display system of claim 1, wherein the first, second, and third screens include a polymer-dispersed liquid crystal layer and a light-absorbing element.

10. The immersive display system of claim 9, further comprising a voltage source configured to deliver voltage to the polymer-dispersed liquid crystal layer to switch the layer from an opaque state to a transparent state.

11. The immersive display system of claim 10, wherein light of the respective video projected by the respective projector is absorbed by the light-absorbing element of the respective when the polymer-dispersed liquid crystal layer of the respective is in the transparent state.

12. The immersive display system of claim 10, wherein light of the respective video projected by the respective projector is scattered by the polymer-dispersed liquid crystal layer of the respective when the polymer-dispersed liquid crystal layer of the respective is in the opaque state.

13. The immersive display system of claim 10, wherein the polymer-dispersed liquid crystal layer is positioned between a first and second conductive layer, wherein the voltage source is configured to apply the voltage to conductive layers.

14. The immersive display system of claim 10, wherein the polymer-dispersed liquid crystal layer is in the transparent state while the voltage source does not deliver the voltage to the polymer-dispersed liquid crystal layer, and is in the opaque state while the voltage source delivers the voltage to the polymer-dispersed liquid crystal layer.

15. The immersive display system of claim 1, wherein a time to switch between the diffuse reflective state and the dark absorptive state is less than or equal to about 1 ms.

16. The immersive display system of claim 9, wherein the polymer-dispersed liquid crystal layer is less than or equal to about 10 μm.

* * * * *